United States Patent [19]

Wierschke

[11] 4,338,650
[45] Jul. 6, 1982

[54] FAIL-SAFE RELAY DRIVING

[75] Inventor: Gilbert W. Wierschke, Englewood, Colo.

[73] Assignee: Otis Elevator Company, Farmington, Conn.

[21] Appl. No.: 205,830

[22] Filed: Nov. 10, 1980

[51] Int. Cl.³ .......................................... H01H 47/22
[52] U.S. Cl. .................................. 361/139; 361/203; 361/204; 361/210
[58] Field of Search ............... 361/139, 160, 189, 190, 361/203, 204, 210

[56] References Cited

U.S. PATENT DOCUMENTS

| 3,225,268 | 12/1965 | Metzadour | 361/204 X |
| 3,258,654 | 6/1966 | Lutsch et al. | 361/204 X |
| 3,312,876 | 4/1967 | Pohm et al. | 361/204 X |

Primary Examiner—Harry E. Moose, Jr.
Attorney, Agent, or Firm—Robert E. Greenstien

[57] ABSTRACT

A relay is activated by an A.C. signal that is supplied through two toroids, connected in series to a signal source. The signal is inductively coupled through each toroid and each toroid is controlled by a corresponding microprocessor. A voltage is applied to each toroid to drive it into a saturated state in which the signal is not transmitted through the toroid. The microprocessor supplies a signal to its respective toroid to drive it out of this saturated state. Both microprocessors simultaneously provide a signal that activates the A.C. signal source. Power to the relay is automatically discontinued if either microprocessor fails to provide the required coupling signals to the A.C. source or its respective toroid.

4 Claims, 1 Drawing Figure

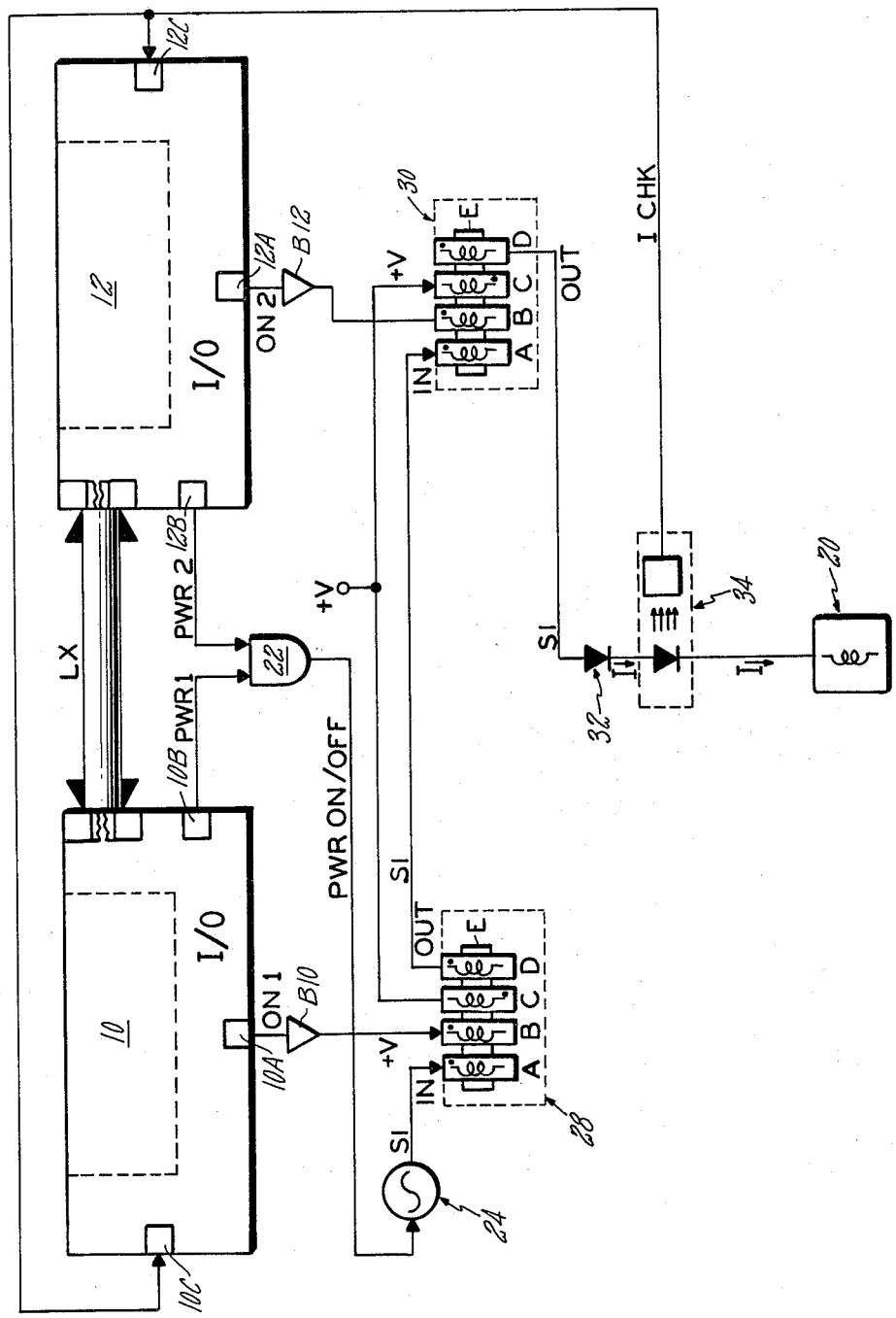

FAIL-SAFE RELAY DRIVING

DESCRIPTION

1. Technical Field

This invention relates to techniques for providing fail-safe operation of a relay or similar control device.

2. Background Art

Fail-safe relay operation is utilized in many applications. In automated vehicle transportation systems, for example, often a relay is sustained in an activated state so that if the system fails for any reason, such as failure in the vehicle controller or a power failure, the relay will automatically be deactivated to initiate a braking operation that stops the car slowly and safely.

To achieve this operation such systems have used solid-state devices to control power to the relay. The disadvantage in this is that the devices are not fail-safe; hence relay operation is not fail-safe.

DISCLOSURE OF INVENTION

An object of the present invention is to provide an arrangement for virtually fail-safe operation of such relays and similarly utilized control devices.

According to the invention, an alternating current (A.C.) power source is simultaneously controlled by at least two controllers. It provides power only on a positive command from each controller and its output is coupled through two series controllable, inductive coupling devices to activate the relay. Each controller controls one of the coupling devices by supplying one of two signals that are required to sustain the device in a state in which the power can flow through it. The other signal is supplied from a reference or constant source. If either signal is not supplied, either device will enter a power decoupling state, causing the relay to be deactivated.

Also according to the invention, the power flow to the relay may be monitored periodically by each controller by turning off the A.C. source momentarily or removing the coupling signal provided by the controllers and then sensing if the power flow has stopped. An operating problem anywhere in the relay or in the control system is indicated if the power is not stopped during this test sequence.

The present invention provides a novel way for providing power to a vital relay without the use of semiconductor switches and the like, which are particularly susceptible to internal circuit problems, such as shorts or open circuits, any of which may cause improper operation of the relay.

The present invention also provides a power coupling arrangement which draws very little power from the controllers. It also provides excellent isolation between the controllers and the vital relay.

As a result of all these characteristics, an arrangement according to the present invention is exceptionally reliable.

BRIEF DESCRIPTION OF DRAWING

The drawing is a functional block diagram of a relay driving system using two microprocessors, according to the present invention.

BEST MODE FOR CARRYING OUT THE INVENTION

The system shown in the drawing uses two microprocessors 10 and 12. The two microprocessors communicate with each other over lines LX to perform a number of control functions, including the operation of a vital relay 20. The microprocessors are functionally depicted and only pertinent signal ports (e.g. 10A, 12A) in the input/output (I/O) section are shown. RAMS, ROMS, clocks and other well known and understood microprocessor components for providing outputs to these ports are not shown to simplify the explanation of the invention.

According to the invention, the two microprocessors 10, 12 provide power control signals PWR 1, PWR 2 at their output ports 10B and 12B. The power control signals are applied to a gate 22 whose resultant output signal PWR ON/OFF turns on or off an alternating (A.C.) source that produces an output signal S1. As a result, the signal source 24 only produces the signal S1 when the two microprocessors are simultaneously providing the power control signals PWR 1 and PWR 2. The output signal S1 is applied to an input winding A of a toroid 28 which consists of four windings A-D that are wound on, and inductively coupled through, a common magnetic core structure E. As a result of this magnetic coupling, the signal S1, which is applied to the winding A, is coupled through the core E to the toroid output winding D. From this toroid winding D the signal S1 is then applied to the input winding A of a second, similar toroid 30. There, the signal S1 is coupled through the magnetic core E of this toroid 30 to its particular output winding D. The signal S1 which appears on the output winding D of the toroid 30 is then applied to a rectifier circuit 32 which produces unipolar current I, which is applied through an opto-isolator 34 to power the relay 20. This opto-isolator 34 is provided to sense the current I and transmit a signal, which may be high or low depending on the level of the current I, to the input ports 10C and 12C of the microprocessors, for indicating the status of the current or power flow to the relay 20.

The windings C on each toroid 28 and 30 is connected to a bias or cut-off voltage having a level +V. This voltage produces winding current which saturates the core E of each toroid. When the core is in this particular saturated state, transmission of the signal S1 through the toroid is blocked. However, the microprocessors 10, 12 produce control signals ON 1, ON 2 from their output ports 10A, 12A and these signals are applied to buffer circuits B10, B12, which respond by producing an output voltage whose level is also +V. The buffer circuits may be any one of a myriad of such "buffer" devices that are well known in the art for power coupling and interfacing a low level microprocessor output with other components. The output voltage +V from each buffer circuit is applied to another winding B on each toroid; but this winding is reverse wound relative to the winding C, and, as a result, the +V voltage from the buffer circuits produces an opposite magnetization of the core E, thus removing it from the saturated state, caused by the current in the winding C. This allows the signal S1 to be transmitted through the two toroids 28, 30, thus providing power to the relay 20, which is thereby placed in an activated or power on state.

In the event that either processor fails, the A.C. source 24 fails, the gate 22 fails, or the decoupling or coupling voltage are not applied, transmission of the A.C. signal to the rectifier 32 is abruptly stopped. The relay is deactivated, as a result, since the current I stops.

If the decoupling or coupling voltages are not simultaneously applied, either or both of the cores are saturated and power transmission to the relay is blocked, and the relay is deactivated.

The operation of the system is tested by each microprocessor periodically by discontinuing the generating of the controlling signal supplied to the gate 22. This causes the A.C. source 24 to cease generating its output signal. During this test mode, which has a very brief interval, the processor checks the opto-isolator output I CHK, which may be high or low, to see if there is current flowing through the opto-isolator 34. If the system is operating properly, it should not be flowing. The test period duration should be short enough so that the relay does not have a chance to change state, even though the power has been momentarily disrupted.

Each microprocessor can independently perform a two-step test procedure. First, it can discontinue the output of its respective power control signal and then test to see if the current flow to the relay has stopped by sensing the signal level on the input line to its respective input port 10C or 12C from the opto-isolator 34. Following this test, the microprocessor can then discontinue the output of its relay on signal and similarly test the output from the isolator 34. In this manner the operation of each microprocessor, the gate, the buffers B10, B12, the toroids 28 and 30, the isolator 34, and the relay 20 can be checked.

The invention plainly can be utilized with more microprocessors simply by using more toroids in a series connection.

A particular feature of the invention is that very little power is required by each microprocessor to control its corresponding toroid and the possibility of toroid failure is extremely small, as a result. In addition, because magnetic or inductive coupling is used between the various windings, there is excellent isolation between the microprocessor and the other components. In particular, there is complete D.C. coupling between the microprocessor and the relay, and this enhances system reliability. The system is extremely reliable and comparatively inexpensive, as a result. Moreover, interfacing equipment is required between the microprocessor and the toroids and the relay 20, making the arrangement cost attractive.

Obviously, variations and modifications in and to the described embodiment of the invention can be made without departing from the true scope and spirit of the invention embodied therein and described in the following claims.

I claim:
1. An apparatus comprising:
   at least two controllers,
   a control device to which power is provided,
   a power source for generating said power,
   first means for coupling said power source to said device, said means operating under the control of said controllers, characterized in that:
   said power source provides alternating output voltages in response to concurrent control signals from the controllers,
   said power coupling means comprises: a first coupling device which receives the output from said power source and a second coupling device which receives the output from said first coupling device and provides an output to power the control device,
   said first coupling device characterized in that its input and output are inductively coupled when a first and second signal are simultaneously applied thereto, one of said signals being provided by one of the controllers and the other by a constant signal source, the input and output of said first device being substantially, inductively decoupled if either of these signals is not applied thereto,
   said second coupling device characterized in that its input and output are inductively coupled by simultaneous application of said constant signal and a third signal provided by a second of the controllers, the input and output of said second device being substantially, inductively decoupled if either of said signals is not simultaneously applied thereto.

2. An apparatus according to claim 1, characterized in that:
   each of said coupling devices comprises a toroid assembly comprising four coils which are mounted on and inductively coupled through a common core, said device having input and output windings and two control windings through which opposite currents are passed in order to inductively couple the input and output windings.

3. An apparatus according to claim 1, characterized by:
   means in circuit with the control device through which power is supplied to the control device for providing a distinct signal when power is not applied to the control device, and
   said controllers being adapted to periodically deactivate the power source and to receive said signal, for controlling said coupling devices and said power source.

4. An apparatus according to claim 3, characterized in that said means for sensing power flow to the control device is an opto-isolator producing a particular output in response to current flow to the controlled device.

* * * * *